(12) United States Patent
Ervin et al.

(10) Patent No.: US 8,833,058 B2
(45) Date of Patent: Sep. 16, 2014

(54) VARIABLE VALVETRAIN TURBOCHARGED ENGINE

(75) Inventors: James Douglas Ervin, Novi, MI (US); Kim Hwe Ku, West Bloomfield, MI (US); Gregory Patrick McConville, Ann Arbor, MI (US); Brad Alan Boyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 248 days.

(21) Appl. No.: 13/448,215

(22) Filed: Apr. 16, 2012

(65) Prior Publication Data

US 2013/0269315 A1    Oct. 17, 2013

(51) Int. Cl.
| | |
|---|---|
| *F01N 3/00* | (2006.01) |
| *F01N 3/10* | (2006.01) |
| *F01N 1/00* | (2006.01) |
| *F02B 33/44* | (2006.01) |
| *F02D 41/02* | (2006.01) |
| *F01N 13/10* | (2010.01) |

(52) U.S. Cl.
CPC ............. *F02D 41/0245* (2013.01); *Y02T 10/18* (2013.01); *F01N 2430/02* (2013.01); *F01N 13/107* (2013.01)
USPC .................... 60/287; 60/274; 60/284; 60/288; 60/299; 60/323; 60/605.1

(58) Field of Classification Search
CPC ... F01N 3/101; F01N 13/107; F01N 2430/02; F01N 2430/10; F02B 37/00; F02D 13/00; F02D 13/0203; F02D 13/0215; F02D 13/0242; F02D 13/0249; F02D 17/00; F02D 41/06

USPC .......... 60/274, 280, 284, 287, 288, 299, 323, 60/605.1
See application file for complete search history.

(56) References Cited

U.S. PATENT DOCUMENTS

| | | | |
|---|---|---|---|
| 2002/0189240 A1* | 12/2002 | Allevag et al. | 60/285 |
| 2010/0162689 A1* | 7/2010 | Hokuto et al. | 60/287 |
| 2010/0186406 A1 | 7/2010 | Kaneko | |
| 2010/0192882 A1 | 8/2010 | Kaneko | |
| 2010/0212315 A1 | 8/2010 | Irisawa | |
| 2011/0220068 A1* | 9/2011 | Ferch et al. | 123/481 |
| 2011/0302917 A1* | 12/2011 | Styles et al. | 60/602 |

FOREIGN PATENT DOCUMENTS

WO          0003127        1/2000

* cited by examiner

*Primary Examiner* — Audrey K Bradley
(74) *Attorney, Agent, or Firm* — Julia Voutyras; Alleman Hall McCoy Russell & Tuttle LLP (57) ABSTRACT

Embodiments for routing exhaust in an engine are provided. In one example, an engine method comprises, during a first condition, firing a subset of cylinders and routing all exhaust from the subset of cylinders through a first exhaust manifold coupled directly to a catalyst and not a turbocharger, and during a second condition, firing all cylinders, routing a first portion of exhaust through a second exhaust manifold coupled to the turbocharger, and routing a second portion of exhaust through the first exhaust manifold. In this way, exhaust can be directly routed to a catalyst under some conditions.

20 Claims, 4 Drawing Sheets

VARIABLE VALVETRAIN TURBOCHARGED ENGINE

FIELD

The present disclosure relates to a camshaft profile switching system in an engine.

BACKGROUND AND SUMMARY

Turbo charging an engine allows the engine to provide power similar to that of a larger displacement engine while engine pumping work is maintained near the pumping work of a normally aspirated engine of similar displacement. Thus, turbo charging can extend the operating region of an engine. However, turbocharged engines can have difficulty obtaining rapid catalyst light-off times after an engine start. The additional mass and surface area introduced by the turbine housing can reduce the catalyst inlet temperature significantly. Previous solutions to achieve rapid catalyst warm-up have relied on high heat flux combustion strategies and/or turbine bypass valves to increase the temperature of exhaust reaching the catalyst.

However, the inventors herein have recognized a few issues with the above approach. High heat combustion utilizes excess fuel, reducing fuel economy. Further, the use of turbine bypass valves can be complex and may pose sealing and high actuation force requirements.

Thus, in one example, some of the above issues may be at least partly addressed by an engine method comprising, during a first condition, firing a subset of cylinders and routing all exhaust from the subset of cylinders through a first exhaust manifold coupled directly to a catalyst and not a turbocharger, and during a second condition, firing all cylinders, routing a first portion of exhaust through a second exhaust manifold coupled to the turbocharger, and routing a second portion of exhaust through the first exhaust manifold.

In this way, during cold engine start conditions, exhaust from the fired cylinders may be directly routed to the catalyst while bypassing the turbine. The engine may be configured such that the exhaust port surface area between the exhaust valves and catalyst face is reduced, for example, the engine may be an inline four cylinder engine with one exhaust port from each of the inner cylinders coupled directly to the catalyst via the first exhaust manifold. During the cold start operation, a camshaft profile may be set such that only the exhaust ports coupled to the first exhaust manifold are opened. Then, during standard, warmed up operation, all the cylinders are fired and the camshaft profile switched so that each exhaust port of each cylinder is opened, allowing a majority of the exhaust to be directed to the turbine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
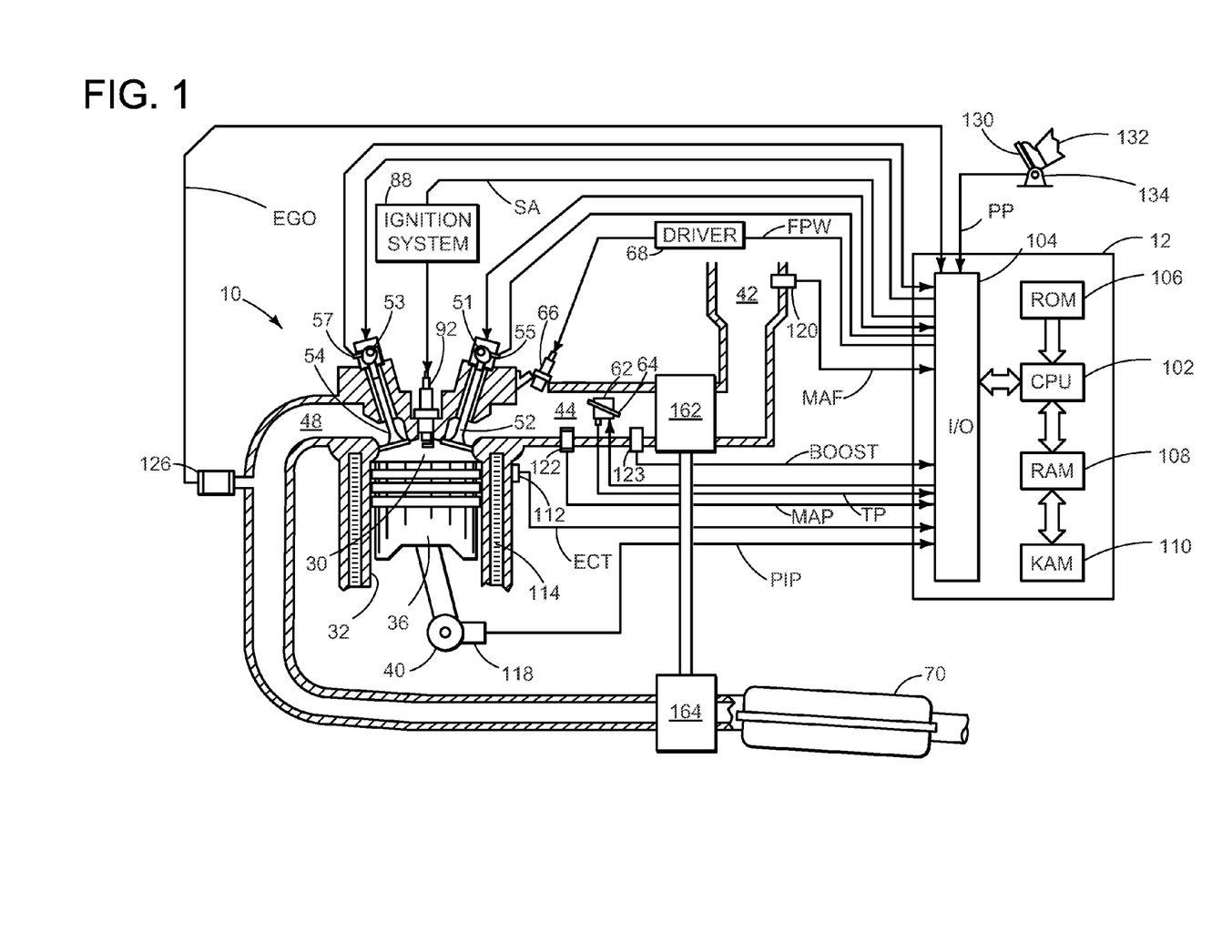
FIG. 1 shows an example engine diagram.
Figure 2:
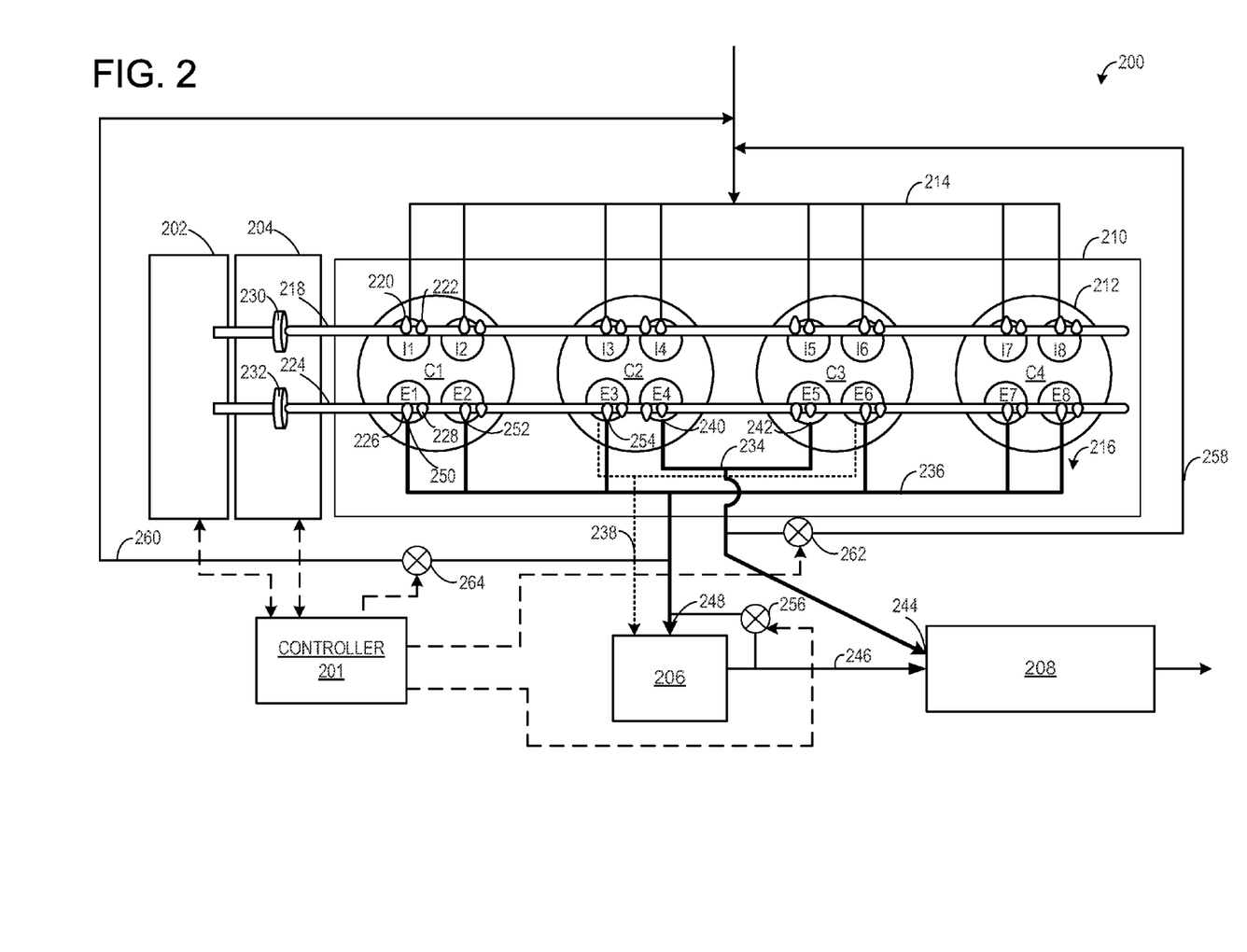
FIG. 2 shows an example engine including a turbocharger and cam profile switching system.
Figure 3:
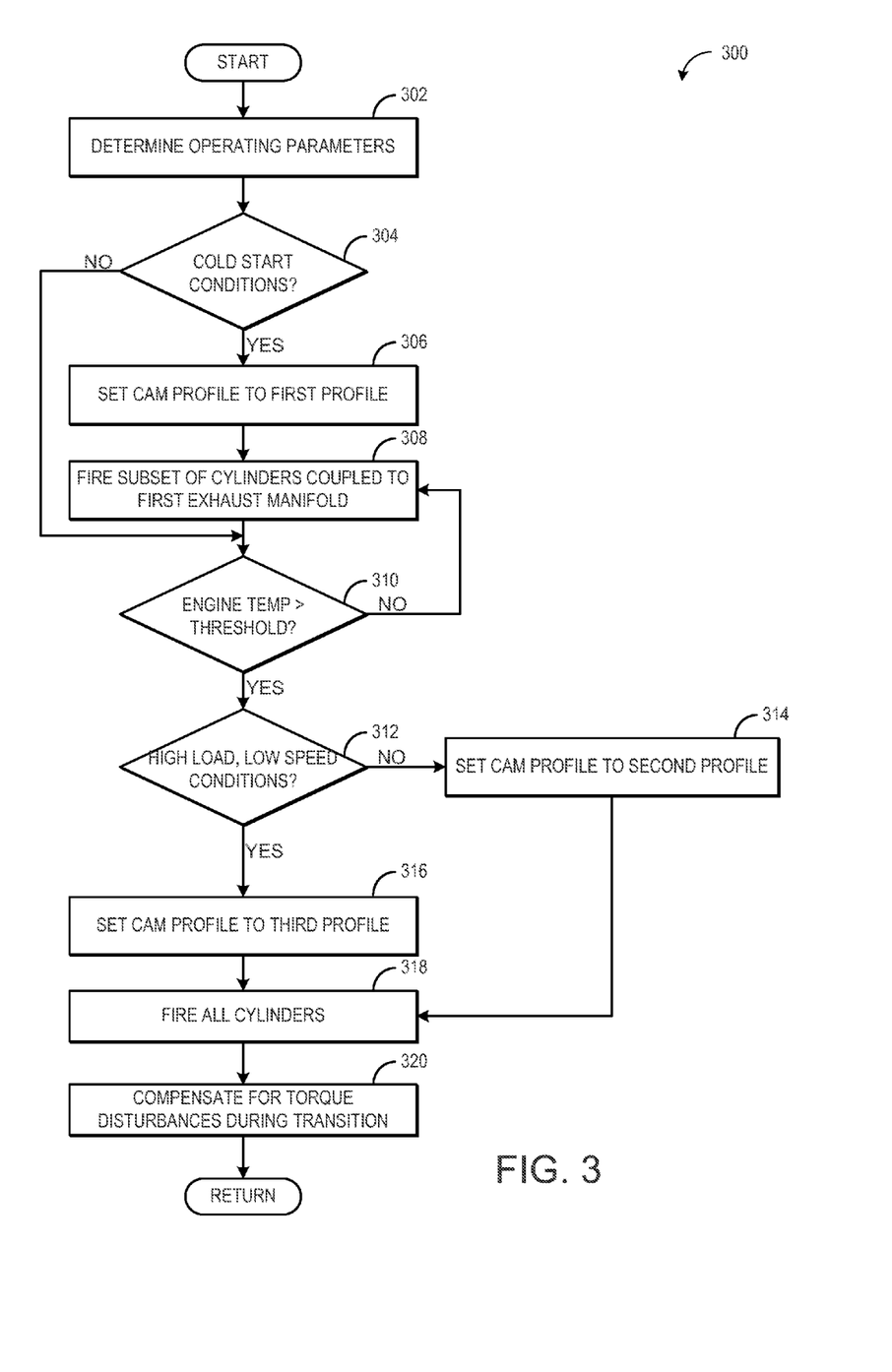
FIG. 3 is a flow chart illustrating a method for operating an engine including a cam profile switching system.
Figure 4:
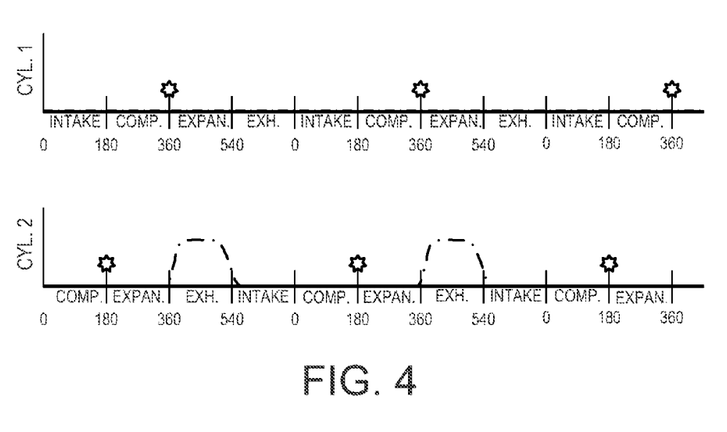
FIGS. 4-6 illustrate example exhaust valve timings according to embodiments of the present disclosure.
Figure 5:
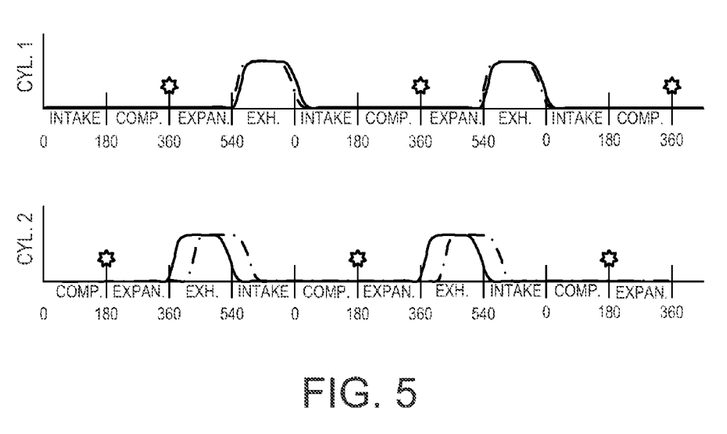
Figure 6:
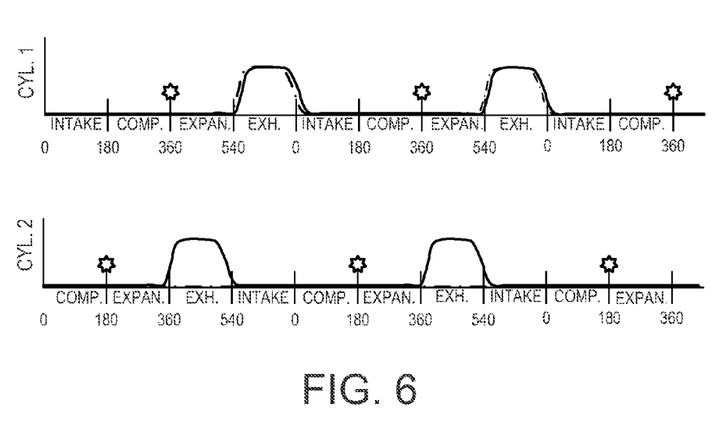

In turbocharged engines, exhaust is typically routed through the turbocharger before reaching one or more downstream exhaust components, such as catalysts. Traveling through the turbocharger may cool the exhaust, due to the additional surface area and longer exhaust path provided by the turbocharger, reducing the catalyst inlet temperature and increasing catalyst light-off time during cold engine starts. To increase catalyst inlet temperature under cold start conditions, a cam profile switching system may be combined with a segmented integrated exhaust manifold and variable displacement engine (VDE) operation to provide a direct, shortened exhaust path to the catalyst. For example, in an inline four cylinder engine, the inner cylinders may each have one exhaust port coupled directly to the catalyst and one exhaust port directly coupled to the turbocharger, via separate exhaust manifolds, while the outer cylinders may only be coupled to the turbocharger. During cold start conditions, a cam profile may be activated wherein only the exhaust valves controlling the ports coupled directly to the catalyst are opened, with all remaining exhaust ports (e.g., the exhaust ports coupled directly to the turbocharger) kept closed. Further, during these conditions, the engine may be operated in VDE mode in order to deactivate the outer cylinders. In this way, the exhaust may be directly routed to the catalyst and not the turbocharger to rapidly warm the catalyst. FIGS. 1 and 2 depict an example engine including an integrated segmented exhaust manifold, systems for operating with cam profile switching and VDE, and a controller which may execute the method of FIG. 3. Example exhaust valve timings during the execution of the method of FIG. 3 are depicted in FIGS. 4-6.

Referring specifically to FIG. 1, it includes a schematic diagram showing one cylinder of multi-cylinder internal combustion engine 10. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion cylinder 30 of engine 10 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion cylinder 30 may receive intake air from intake manifold 44 via intake passage 42 and may exhaust combustion gases via exhaust passage 48. Intake manifold 44 and exhaust passage 48 can selectively communicate with combustion cylinder 30 via respective intake valve 52 and exhaust valve 54. In some embodiments, combustion cylinder 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively or via camshaft sensors. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Combustion cylinder 30 includes a fuel injector 66 arranged in intake passage 42 in a configuration that provides what is known as port injection of fuel into the intake port upstream of combustion cylinder 30. Fuel injector 66 injects fuel therein in proportion to the pulse width of signal FPW received from controller 12 via electronic driver 68. Alternatively or additionally, in some embodiments the fuel injector may be mounted on the side of the combustion cylinder or in the top of the combustion cylinder, for example, to provide what is known as direct injection of fuel into combustion cylinder 30. Fuel may be delivered to fuel injector 66 by a fuel delivery system (not shown) including a fuel tank, a fuel pump, and a fuel rail.

Intake passage 42 may include a throttle 62 having a throttle plate 64. In this particular example, the position of throttle plate 64 may be varied by controller 12 via a signal provided to an electric motor or actuator included with throttle 62, a configuration that may be referred to as electronic throttle control (ETC). In this manner, throttle 62 may be operated to vary the intake air provided to combustion cylinder 30 among other engine combustion cylinders. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of catalytic converter 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. The exhaust system may include light-off catalysts and underbody catalysts, as well as exhaust manifold, upstream and/or downstream air-fuel ratio sensors. Catalytic converter 70 can include multiple catalyst bricks, in one example. In another example, multiple emission control devices, each with multiple bricks, can be used. Catalytic converter 70 can be a three-way type catalyst in one example.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals and information from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Storage medium read-only memory 106 can be programmed with computer readable data representing instructions executable by processor 102 for performing the methods described below as well as variations thereof. The engine cooling sleeve 114 may be coupled to a cabin heating system.

Engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression (e.g., boost) provided to one or more cylinders of the engine via a turbocharger or supercharger may be varied by controller 12. Further, a sensor 123 may be disposed in intake manifold 44 for providing a BOOST signal to controller 12.

FIG. 2 shows an example embodiment of an engine 200, which may be engine 10, including a variable cam timing (VCT) system 202, a cam profile switching (CPS) system 204, a turbocharger 206, a catalyst 208, and a cylinder head 210 with a plurality of cylinders 212. Engine 200 may be one example of engine 10 described above. Engine 200 is shown having an intake manifold 214 configured to supply intake air and/or fuel to the cylinders 212 and a segmented integrated exhaust manifold 216 configured to exhaust the combustion products from the cylinders 212. Segmented exhaust manifold 216 may include a plurality of outlets, each coupled to different exhaust components. For example, one outlet may be coupled to catalyst 208 and one outlet may be coupled to turbocharger 206. Additional details regarding exhaust manifold 216 will be presented below. While in the embodiment depicted in FIG. 2, intake manifold 214 is separate from cylinder head 210 while exhaust manifold 216 is integrated in cylinder head 210, in other embodiments, intake manifold 214 may be integrated and/or exhaust manifold 216 may be separate from cylinder head 210.

Cylinder head 210 includes four cylinders, labeled C1-C4. Cylinders 212 may each include a spark plug and a fuel injector for delivering fuel directly to the combustion chamber, as described above in FIG. 1. However, in alternate embodiments, each cylinder may not include a spark plug and/or direct fuel injector. Cylinders may each be serviced by one or more valves. In the present example, cylinders 212 each include two intake valves and two exhaust valves Each intake and exhaust valve is configured to open and close an intake port and exhaust port, respectively. The intake valves are labeled I1-I8 and the exhaust valves are labeled E1-E8. Cylinder C1 includes intake valves I1 and I2 and exhaust valves E1 and E2; cylinder C2 includes intake valves I3 and I4 and exhaust valves E3 and E4; cylinder C3 includes intake valves I5 and I6 and exhaust valves E5 and E6; and cylinder C4 includes intake valves I7 and I8 and exhaust valves E7 and E8. Each exhaust port of each cylinder may be of equal diameter. However, in some embodiments, some of the exhaust ports may be of different diameter. For example, the exhaust ports controlled by exhaust valves E4 and E5 may be of smaller diameter than the remaining exhaust ports.

Each intake valve is actuatable between an open position allowing intake air into a respective cylinder and a closed position substantially blocking intake air from the respective cylinder. Further, FIG. 2 shows how intake valves I1-I8 may be actuated by a common intake camshaft 218. Intake camshaft 218 includes a plurality of intake cams configured to control the opening and closing of the intake valves. Each intake valve may be controlled by first intake cams 220 and second intake cams 222. Further, in some embodiments, one or more additional intake cams may be included to control the intake valves. In the present example, first intake cams 220 have a first cam lobe profile for opening the intake valves for a first intake duration. Further, in the present example, second intake cams 222 have a second cam lobe profile for opening the intake valve for a second intake duration. The second intake duration may be a shorter intake duration (shorter than the first intake duration), the second intake duration may be a longer intake duration (longer than the first duration), or the first and second duration may be equal. Additionally, intake camshaft 218 may include one or more null cam lobes. Null cam lobes may be configured to maintain respective intake valves in the closed position.

Each exhaust valve is actuatable between an open position allowing exhaust gas out of a respective cylinder of the cylinders 212 and a closed position substantially retaining gas within the respective cylinder. Further, FIG. 2 shows how exhaust valves E1-E8 may be actuated by a common exhaust camshaft 224. Exhaust camshaft 224 includes a plurality of exhaust cams configured to control the opening and closing of the exhaust valves. Each exhaust valve may be controlled by first exhaust cams 226 and second exhaust cams 228. Further, in some embodiments, one or more additional exhaust cams may be included to control the exhaust valves. In the present example, first exhaust cams 226 have a first cam lobe profile for opening the exhaust valves for a first exhaust duration. Further, in the present example, second exhaust cams 228 have a second cam lobe profile for opening the exhaust valve for a second exhaust duration. The second exhaust duration may be a shorter, longer, or equal to the first exhaust duration. Additionally, exhaust camshaft 224 may include one or more null cam lobes. Null cam lobes may be configured to maintain respective exhaust valves in the closed position.

Additional elements not shown may further include push rods, rocker arms, tappets, etc. Such devices and features may control actuation of the intake valves and the exhaust valves by converting rotational motion of the cams into translational motion of the valves. In other examples, the valves can be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 212 may each have only one exhaust valve and/or intake valve, or more than two intake and/or exhaust valves. In still other examples, exhaust valves and intake valves may be actuated by a common camshaft. However, in an alternate embodiment, at least one of the intake valves and/or exhaust valves may be actuated by its own independent camshaft or other device.

A subset of the exhaust valves of cylinders 212 may be deactivated, if desired, via one or more mechanisms. For example, exhaust valves E4 and E5, which are coupled to exhaust manifold 234 (explained in more detail below) may be deactivated via switching tappets, switching rocker arms, or switching roller finger followers. During modes where VDE is activated, the intake valves may be deactivated utilizing similar mechanisms.

Engine 200 may include variable valve actuation systems, for example CPS system 204, and variable cam timing VCT system 202. A variable valve actuation system may be configured to operate in multiple operating modes. The first operating mode may occur following a cold engine start, for example when engine temperature is below a threshold or for a given duration following an engine start. During the first mode, the variable valve actuation system may be configured to open only a subset of exhaust ports of a subset of cylinders, with all other exhaust ports closed. For example, only exhaust valves E4 and E5 of cylinders C2 and C3 may be opened. A second operating mode may occur during standard, warmed up engine operation. During the second mode, the variable valve actuation system may be configured to open all exhaust ports of all cylinders. Further, during the second mode, the variable valve actuation system may be configured to open the subset of exhaust ports of the subset of cylinders for a shorter duration than the remaining exhaust ports. A third operating mode may occur during warmed up engine operation with low engine speed and high load. During the third mode, the variable valve actuation system may be configured to keep the subset of exhaust ports of the subset of cylinders closed while opening the remaining exhaust ports, e.g., opposite of the first mode. Additionally, the variable valve actuation system may be configured to selectively open and close the intake ports in correspondence to the opening and closing of the exhaust ports during the various operating modes.

CPS system 204 may be configured to translate specific portions of intake camshaft 218 longitudinally, thereby causing operation of intake valves I1-I8 to vary between first intake cams 220 and second intake cams 222 and/or other intake cams. Further, CPS system 204 may be configured to translate specific portions of exhaust camshaft 224 longitudinally, thereby causing operation of exhaust valves E1-E8 to vary between first exhaust cams 226 and second exhaust cams 228 and/or other exhaust cams. In this way, CPS system 204 may switch between multiple profiles. For example, during the first operating mode discussed above, the CPS system 204 may be switched to a first profile. Further, the CPS system 204 may be switched to a second profile during the second mode, and switched to a third profile during the third mode. In doing so, the CPS system 204 may switch between a first cam, for opening a valve for a first duration, a second cam, for opening the valve for a second duration, and/or additional or null cams. CPS system 204 may be controlled via signal lines by controller 201 (controller 201 is one non-limiting example of controller 12 of FIG. 1).

The configuration of cams described above may be used to provide control of the amount and timing of air supplied to, and exhausted from, the cylinders 212. However, other configurations may be used to enable CPS system 204 to switch valve control between two or more cams. For example, a switchable tappet or rocker arm may be used for varying valve control between two or more cams.

Engine 200 may further include VCT system 202. VCT system 202 may be a twin independent variable camshaft timing system, for changing intake valve timing and exhaust valve timing independently of each other. VCT system 202 includes intake camshaft phaser 230 and exhaust camshaft phaser 232 for changing valve timing. VCT system 202 may be configured to advance or retard valve timing by advancing or retarding cam timing (an example engine operating parameter) and may be controlled via signal lines by controller 201. VCT system 202 may be configured to vary the timing of valve opening and closing events by varying the relationship between the crankshaft position and the camshaft position. For example, VCT system 202 may be configured to rotate intake camshaft 218 and/or exhaust camshaft 224 independently of the crankshaft to cause the valve timing to be advanced or retarded. In some embodiments, VCT system 202 may be a cam torque actuated device configured to rapidly vary the cam timing. In some embodiments, valve timing such as intake valve closing (IVC) and exhaust valve closing (EVC) may be varied by a continuously variable valve lift (CVVL) device. The valve/cam control devices and systems described above may be hydraulically powered, or electrically actuated, or combinations thereof. Signal lines can send control signals to and receive a cam timing and/or cam selection measurement from CPS system 204 and VCT system 202.

Returning to integrated exhaust manifold 216, it may be configured with multiple outlets to selectively direct exhaust gas to various exhaust components. Integrated exhaust manifold 216 may be a single, segmented exhaust manifold including multiple outlets in some embodiments. In other embodiments, cylinder head 210 may include multiple separate exhaust manifolds, each having one outlet. Furthermore, the separate exhaust manifolds may be included in a common casting in cylinder head 210. In the embodiment of FIG. 2, exhaust manifold 216 includes a first exhaust manifold 234, second exhaust manifold 236, and, in some embodiments, a third exhaust manifold 238.

First exhaust manifold 234 couples a subset of exhaust ports of a subset of the cylinders directly to the catalyst 208 and not the turbocharger 206. As shown in FIG. 2, the exhaust ports of exhaust valves E4 and E5 of cylinders C2 and C3, respectively, are coupled to the first exhaust manifold 234. First exhaust manifold 234 includes a first inlet 240 coupled only to the exhaust port controlled by exhaust valve E4 and a second inlet 242 coupled only to the exhaust port controlled by exhaust valve E5. Further, first exhaust manifold 234 includes an outlet 244 coupled to the catalyst 208. As such, when exhaust valves E4 and E5 open, exhaust is directed through the first exhaust manifold 234 to the catalyst 208, without passing through the turbocharger 206. While the embodiment depicted in FIG. 2 couples the outlet 244 directly to catalyst 208, in some embodiments the outlet 244 may be coupled to a common exhaust passage 246 upstream of the catalyst 208 but downstream of turbocharger 206.

Second exhaust manifold 236 includes an outlet 248 that is coupled to the turbocharger 206. Second exhaust manifold 236 couples at least a subset of the cylinders to the turbocharger 206. As shown in FIG. 2, each remaining exhaust port not coupled to the first exhaust manifold 234 is coupled to an inlet of the second exhaust manifold 236 (e.g., exhaust ports of exhaust valves E1, E2, E3, E6, E7, and E8 are only coupled to the second exhaust manifold 236). For example, second exhaust manifold includes a first inlet 250 coupled only to the exhaust port of exhaust valve E1 and a second inlet 252 coupled only to the exhaust port of exhaust valve E2, both of outer cylinder C1. The exhaust port controlled by exhaust valve E3 of inner cylinder C2 is coupled only to third inlet 254 of second exhaust manifold 236. Inner cylinder C3 and outer cylinder C4 include similar inlets coupling their respective exhaust ports to second exhaust manifold 236. Thus, each exhaust port of the outer cylinders is coupled to the second exhaust manifold 236, while only one exhaust port of the inner cylinders is coupled to the second exhaust manifold 236.

However, in some embodiments, the turbocharger 206 may be a twin-scroll turbocharger. As such, a third exhaust manifold 238 may be present to couple a subset of cylinders to one scroll of the twin-scroll turbocharger. The second exhaust manifold 236 may be coupled to a first scroll of the twin-scroll turbocharger, and thus only a portion of the exhaust ports not coupled to the first exhaust manifold may be coupled to the second exhaust manifold (e.g., exhaust ports of E1, E2, E7, and E8). In such embodiments, the third exhaust manifold 238 may couple another subset of the remaining exhaust ports (e.g., the exhaust ports of E3 and E6) to a second scroll of the twin-scroll turbocharger.

In order to further regulate boost pressure, turbocharger 206 includes a turbine bypass valve 256. During some conditions, turbine bypass valve 256 may be opened to redirect a portion of the exhaust from the second and/or third exhaust manifold around the turbocharger. Turbine bypass valve 256 may be opened to reduce exhaust backpressure, lower boost pressure, etc. in response to signals from the controller 201.

An exhaust gas recirculation (EGR) system may direct a portion of exhaust through EGR passages 258, 260 to the intake. The amount of EGR directed to the intake may be regulated by EGR valves 262 and 264, which receive signals from controller 201. As shown in FIG. 2, the EGR system is configured to direct exhaust from only upstream of the turbocharger to the intake, in a high-pressure EGR configuration. However, other configurations are possible. For example, the EGR system may be configured to direct exhaust from downstream the turbocharger to the intake, in what is referred to as low-pressure EGR. By including multiple EGR passages, one directing exhaust from the first exhaust manifold 234 and one directing exhaust from the second exhaust manifold 236, the EGR system may selectively direct exhaust based on operating conditions. For example, in conditions where hot EGR is desired, EGR from the EGR passage 258 may be selectively directed to the intake. However, when cooler EGR is desired, EGR from EGR passage 260 may be selectively directed to the intake.

As described above, FIG. 2 shows a non-limiting example of an internal combustion engine and associated intake and exhaust systems. It should be understood that in some embodiments, the engine may have more or less combustion cylinders, control valves, throttles, and compression devices, among others. Example engines may have cylinders arranged in a "V" configuration. Further, a first camshaft may control the intake valves for a first group or bank of cylinders and a second camshaft may control the intake valves for a second group of cylinders. In this manner, a single CPS system and/or VCT system may be used to control valve operation of a group of cylinders, or separate CPS and/or VCT systems may be used.

FIG. 3 is a flow chart illustrating a method 300 for controlling exhaust flow in an engine. Method 300 may be carried out according to instructions stored in the memory of a controller, such as controller 12 or 201. Method 300 may be performed in response to engine operating parameters determined by various engine sensors, such as ECT sensor 112, and may control various engine actuators, such as CPS system 204 and VCT system 202.

Method 300 includes, at 302, determining engine operating parameters. The engine operating parameters may include engine speed, load, temperature, number of engine cycles since engine start, camshaft timing, camshaft profile, etc. At 304, it is determined if the engine is in cold start operation. Cold start operation may include engine temperature below a threshold, such as 200° C. In other embodiments, cold start operation may be determined based on a time since an engine start, such as within 30 seconds of the engine start. If it is determined that the engine is not in cold start operation, method 300 proceeds to 310, which will be discussed in more detail below. If the engine is in cold start operation, method 300 proceeds to 306 to set a camshaft profile switching system, such as CPS system 204, to a first profile. The first profile is configured to only open a subset of exhaust ports of the engine. Specifically, the first profile only opens the exhaust ports that are coupled to a catalyst via a first exhaust manifold, such as first exhaust manifold 234, and not coupled to a turbocharger. As used herein, the term "opening an exhaust port" refers to the valve actuation system opening an exhaust valve during a predefined duration of the engine cycle, such as the exhaust stroke, in order to allow the exhaust port to be opened and expel exhaust gas. During the remaining portions of the engine cycle, in which the exhaust port would normally be closed, the exhaust ports that are allowed to open during the exhaust stroke are kept closed. Further, the first profile includes only a subset of the intake ports of the subset of cylinders being allowed to open. For example, only one intake valve of cylinder C2 and one intake valve of cylinder C3 may open during the intake stroke, with the remaining intake valves kept closed.

At 308, the subset of cylinders coupled to the first exhaust manifold (e.g., cylinders C2 and C3 of FIG. 2) are fired, with the remaining cylinders deactivated. As explained previously, the engine may be configured to operate in a VDE mode, where only a subset of the cylinders are fired. The fired cylinders receive fuel, intake air, and spark ignition in order to initiate combustion. The deactivated cylinders do not receive fuel or spark ignition. Further, the first CPS profile includes only opening the intake valves of the subset of cylinders that are coupled to the catalyst. In doing so, the non-fired cylinders (e.g., cylinders C1 and C4 of FIG. 2) do not receive intake air. Firing only the subset of cylinders coupled to the first exhaust manifold may include adjusting fuel distribution among the cylinders. For example, under standard operation wherein all cylinders are fired, the fuel may be equally distributed among all the cylinders. However, during VDE operation wherein only a subset of the cylinders receive fuel, the amount of fuel delivered to the fired cylinders may be increased, such that the same amount of overall fuel is delivered to the engine during VDE operation as compared to non-VDE operation.

At 310, it is determined if engine temperature has reached a threshold. The threshold may be warmed up engine temperature wherein the exhaust is hot enough to maintain the catalyst at or above its light-off temperature, such as 200° C. If the engine has not reached the threshold, method 300 returns to continue to operate with the first cam profile and only fire a subset of the cylinders. If the engine has reached the threshold temperature, that is, if the engine is no longer in cold start operation, method 300 proceeds to 312 to determine if the engine is operating under high load, low speed conditions. During high load, low speed conditions, the engine is operating with peak torque, and as such utilizes a high amount of boost to reach the peak torque. However, with low engine speed, less exhaust pressure is produced, and thus all available exhaust is used to drive the turbine in order to produce the high amount of boost. High load may be a suitable load, such as above 50% load, and low speed may be a suitable speed, such as below 1000 RPM. However, other load and speed ranges are possible. Further, high load, low speed conditions may be determined based on desired boost pressure and determined exhaust pressure, for example.

If the engine is not operating under high load, low speed conditions, method 300 proceeds to 314 to set the cam profile to a second profile. The second profile may be used during standard, warmed up engine conditions, wherein speed and load conditions are matched (e.g., low speed, low load) or the engine is otherwise producing sufficient exhaust pressure to drive the turbine. The second cam profile may be configured to allow each exhaust port of each cylinder to open at its prescribed time. For example, each exhaust valve may be opened during each respective exhaust stroke. The second cam profile may be further configured to delay the opening of the exhaust ports coupled to the catalyst via the first exhaust manifold. For example, exhaust valves E4 and E5 of FIG. 2 may be opened 0-60° CA later than the remaining exhaust valves. Additionally, the second cam profile may be configured to allow each intake port of each cylinder to open during a respective intake stroke.

At 318, method 300 includes firing all cylinders. Firing all cylinders includes injecting fuel to each cylinder and providing spark ignition to each cylinder. If the engine was previously operating in VDE mode, the fuel may be redistributed such that each cylinder receives the same amount of fuel. Further, at 320, method 300 includes compensating for any torque disturbances that may occur during the transition out of VDE mode. Prior to firing each cylinder, the throttle position may be adjusted to increase airflow to the cylinders so that desired intake air is present in the intake manifold when the intake valves of the previously deactivated cylinders are allowed to open. To ensure an over-torque event does occur when the cylinder airflow is increased, spark timing may be retarded in the fired cylinders. Once the transition has occurred and all cylinders are firing, spark timing may be returned to MBT.

During operation with the second cam profile, a portion of the exhaust is directed to the turbocharger via the second exhaust manifold (e.g., second exhaust manifold 236 of FIG. 2), and boost pressure is regulated by controlling the position of the turbine bypass valve. Since the exhaust ports coupled to the first exhaust manifold also open, a portion of the exhaust is directed to the catalyst and not the turbocharger via the first exhaust manifold. However, this portion may be smaller than the portion directed to the turbocharger, due the later opening time of the exhaust valves E4 and E5, and/or due to these exhaust ports being of smaller diameter than the other exhaust ports. Upon setting the second cam profile and firing all cylinders, method 300 returns.

Returning to 312, if it determined that the engine is operating with high load, low speed conditions, the cam profile is switched to a third profile at 316. The third profile is configured to keep the exhaust ports coupled to the first exhaust manifold closed while allowing the remaining exhaust ports to open. Additionally, in some embodiments, of the remaining exhaust ports, only one exhaust port per cylinder may be opened. For example, in the third cam profile, only exhaust ports E2, E3, E6, and E7 may be opened, in order to maintain combustion balance between the cylinders. The third profile is configured to direct all exhaust to the turbocharger before reaching the catalyst (e.g., no exhaust is directed through the first exhaust manifold). Further, under these conditions, the turbine bypass valve may be closed in order to produce a maximum amount of boost. Similar to the second cam profile, operating with the third cam profile includes, at 318, firing each cylinder and compensating for torque disturbances during the transition out of VDE mode at 320. Upon activating the third cam profile and firing all cylinders, method 300 returns.

Thus, method 300 provides for switching between multiple camshaft profiles, depending on operating conditions. The camshaft profiles enable selective routing of exhaust to a catalyst, either through a turbocharger or bypassing the turbocharger. As shown in Table 1 below, which lists each cam profile and exhaust valve states during respective exhaust stokes for each exhaust valve of the engine depicted in FIG. 2, the CPS system may toggle between three cam profiles in order to optimize exhaust flow during the various operating modes described above with respect to FIG. 3.

TABLE 1

| Cam profile | E1 | E2 | E3 | E4 | E5 | E6 | E7 | E8 |
|---|---|---|---|---|---|---|---|---|
| 1 | Closed | Closed | Closed | Open | Open | Closed | Closed | Closed |
| 2 | Open | Open | Open | Delay | Delay | Open | Open | Open |
| 3 | Optional | Open | Open | Closed | Closed | Open | Open | Optional |

FIGS. 4-6 depict exhaust valve timing diagrams for two representative cylinders during each of the three modes of operation (including the three CPS profiles depicted in Table 1). The exhaust valve timings for the valves of outer cylinder C1 and inner cylinder C2 are depicted. For each diagram, timing in degrees crankshaft angle is depicted on the x axis. Exhaust valve opening state is depicted on each respective y axis. An example firing order of 1-3-4-2 is depicted in FIGS. 4-6, with combustion events labeled with a star. Each stroke of the engine cycle is labeled along the x axis. For each cylinder, one exhaust valve (E1 and E3) timing diagram is depicted by a solid line, while one exhaust valve (E2 and E4) timing diagram is depicted by a dashed-dotted line.

FIG. 4 illustrates exhaust valve timing for the exhaust valves of cylinder 1 and cylinder 2 during the first, cold start mode, with the first cam profile activated. In cold start conditions, a first cam profile is activated and a VDE operation is enabled so that only the exhaust ports coupled to a first exhaust manifold are opened. The first exhaust manifold is coupled to the catalyst and not the turbocharger. Thus, in cold start conditions with the first cam profile, all exhaust is routed directly to the catalyst and not the turbocharger. This allows rapid catalyst heating by directing the exhaust to the catalyst in the shortest exhaust path available. As shown in FIG. 4, the engine is operating in VDE operation with the first cylinder deactivated, and the exhaust valves of cylinder 1 remain closed over the duration of the engine cycle. For cylinder 2, one exhaust valve (E4) is opened during each exhaust stroke, depicted as the dashed-dotted line. The other exhaust valve (E3) remains closed.

FIG. 5 illustrates exhaust valve timing for the exhaust valves of cylinder 1 and cylinder 2 during the second, standard operation mode. Once the engine has warmed up, the second cam profile is activated to enable opening of all exhaust ports. This allows a portion of the exhaust to be directed through the turbocharger, and a smaller portion to be directed to the catalyst and not the turbocharger. In this way, a majority of the exhaust is routed to the turbocharger to enable the turbocharger to provide a desired amount of boost. As depicted in FIG. 5, both exhaust valves of cylinder 1 (E1 and E2, solid line and dashed-dotted line, respectively) open during the exhaust stroke. Additionally, both exhaust valves of cylinder 2 (E3 and E4, solid line and dashed-dotted line, respectively) open during the exhaust stroke. However, exhaust valve E4 has a delayed opening time relative to exhaust valve E3.

FIG. 6 illustrates exhaust valve timing for the exhaust valves of cylinder 1 and cylinder 2 during the third, peak torque mode. A third cam profile enables all exhaust to be routed to the turbocharger. The third profile may be activated during conditions where maximum boost is indicated, such as low speed, high load conditions. The third profile may keep the exhaust ports directly coupled to the catalyst from opening while opening the remaining exhaust ports. As depicted in FIG. 6, both exhaust valves of cylinder 1 (E1 and E2, solid line and dashed-dotted line, respectively) open during the exhaust stroke. However, for cylinder 2, only one exhaust valve (E3, solid line) opens while the exhaust valve E4 remains closed.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system comprising:
a first cylinder including two exhaust ports coupled to a turbocharger via an integrated exhaust manifold;
a second cylinder including a first exhaust port coupled to the turbocharger via the integrated exhaust manifold and a second exhaust port coupled to a catalyst and not the turbocharger; and
a system including a camshaft with profiles and configured to:
only allow the second exhaust port to open during a first condition, and
allow each exhaust port to open during a second condition.

2. The engine system of claim 1, wherein the first condition comprises cold engine operation.

3. The engine system of claim 1, wherein the second condition comprises warmed-up engine operation.

4. The engine system of claim 1, wherein the first exhaust port of the second cylinder has a larger diameter than the second exhaust port of the second cylinder.

5. The engine system of claim 1, further comprising two intake ports on each cylinder, and wherein the system including the camshaft with profiles is further configured to allow each intake port to open during the first and second conditions.

6. The engine system of claim 1, wherein the system including the camshaft with profiles is further configured to, during the second condition, open the second exhaust port later than the first exhaust port.

7. The engine system of claim 1, further comprising two intake ports on each cylinder, and wherein the system including the camshaft with profiles is further configured to:
allow each intake port of the first cylinder to open during the first and second conditions;

only allow one intake port of the second cylinder to open during the first condition; and allow each intake port of the second cylinder to open during the second condition.

8. A method, comprising:
during first conditions, firing a subset of cylinders and routing all exhaust from the subset of cylinders through a first manifold coupled directly to a catalyst and not a turbocharger; and
during second conditions, firing all cylinders, routing a first portion of exhaust from all cylinders through a second manifold coupled to the turbocharger, and routing a second portion of exhaust from only the subset of cylinders through the first manifold.

9. The engine method of claim 1, wherein the first conditions comprise engine temperature below a threshold.

10. The engine method of claim 1, wherein the second conditions comprise engine temperature above a threshold and medium to high engine load.

11. The engine method of claim 1, wherein the engine is an inline engine, and wherein the subset of cylinders comprises at least one inner cylinder.

12. The engine method of claim 1, wherein routing all exhaust from the subset of cylinders through the first manifold further comprises activating a camshaft profile configured to open only a subset of exhaust ports of the subset of cylinders, with all other exhaust ports closed.

13. The engine method of claim 1, wherein the turbocharger is a twin-scroll turbocharger, wherein routing the first portion of exhaust through the second manifold coupled to the turbocharger further comprises routing the first portion of exhaust to a first scroll of the turbocharger, and further comprising routing a third portion of exhaust through a third manifold coupled to a second scroll of the turbocharger.

14. The engine method of claim 1, further comprising, during a third condition, firing all cylinders and routing all exhaust from each cylinder through the second manifold.

15. The engine method of claim 14, wherein the third condition comprises engine temperature above a threshold, low engine speed, and medium to high engine load.

16. The engine method of claim 1, wherein routing the first portion of exhaust through the second manifold and routing the second portion of exhaust through the first manifold further comprises activating a camshaft profile configured to open each exhaust port of each cylinder.

17. The engine method of claim 16, wherein activating the camshaft profile configured to open each exhaust port of each cylinder further comprises activating a camshaft profile configured to open a subset of exhaust ports of the subset of cylinders later than all other exhaust ports.

18. A method for an engine having a plurality of cylinders, each cylinder having two exhaust valves, comprising:
during low speed, high load conditions,
deactivating a subset of exhaust valves and activating at least a portion of remaining exhaust valves, the subset of exhaust valves controlling exhaust ports coupled to a catalyst via a first exhaust manifold and the remaining exhaust valves controlling exhaust ports coupled to a turbocharger via a second exhaust manifold, and
directing exhaust from a first cylinder of the plurality of cylinders and exhaust from a second cylinder of the plurality of cylinders to the turbocharger via the second exhaust manifold; and
during medium to high load and speed conditions,
activating all exhaust valves of the engine, and
directing all exhaust from the first cylinder to the turbocharger via the second exhaust manifold and directing exhaust from the second cylinder to the turbocharger via the second exhaust manifold and to the catalyst via the first exhaust manifold.

19. The method of claim 18, wherein activating at least a portion of remaining exhaust valves further comprises activating all remaining exhaust valves.

20. The method of claim 18, wherein deactivating a subset of exhaust valves and activating at least a portion of remaining exhaust valves further comprises activating one exhaust valve per cylinder while deactivating one exhaust valve per cylinder.

* * * * *